(12) United States Patent
Kobuki

(10) Patent No.: US 10,204,263 B2
(45) Date of Patent: Feb. 12, 2019

(54) MONITORING SYSTEM, MONITORING METHOD, AND PROGRAM

(71) Applicant: NTT DATA SMS CORPORATION, Tokyo (JP)

(72) Inventor: Akira Kobuki, Tokyo (JP)

(73) Assignee: NTT DATA SMS CORPORATION, Tokyo (JP)

( * ) Notice: Subject to any disclaimer, the term of this patent is extended or adjusted under 35 U.S.C. 154(b) by 0 days.

(21) Appl. No.: 15/527,207

(22) PCT Filed: Nov. 10, 2015

(86) PCT No.: PCT/JP2015/081661
§ 371 (c)(1),
(2) Date: May 16, 2017

(87) PCT Pub. No.: WO2016/080250
PCT Pub. Date: May 26, 2016

(65) Prior Publication Data
US 2017/0330027 A1  Nov. 16, 2017

(30) Foreign Application Priority Data
Nov. 21, 2014 (JP) .................................. 2014-236919

(51) Int. Cl.
G06K 9/00 (2006.01)
H04N 21/442 (2011.01)
H04N 21/458 (2011.01)

(52) U.S. Cl.
CPC ... *G06K 9/00288* (2013.01); *H04N 21/44218* (2013.01); *H04N 21/458* (2013.01)

(58) Field of Classification Search
None
See application file for complete search history.

(56) References Cited

U.S. PATENT DOCUMENTS

2006/0210167 A1  9/2006  Inoue et al.
2009/0133051 A1*  5/2009  Hildreth ............... H04N 5/4403
                                                        725/28
2013/0305146 A1  11/2013  Hashiba et al.

FOREIGN PATENT DOCUMENTS

JP  2000-297567 A  10/2000
JP  2006-031287 A   2/2006
(Continued)

OTHER PUBLICATIONS

International Search Report for PCT/JP2015/081661, ISA/JP, Tokyo, with English translation, dated Jan. 26, 2016.

*Primary Examiner* — Stephen P Coleman
(74) *Attorney, Agent, or Firm* — Harness, Dickey & Pierce, P.L.C.

(57) ABSTRACT

A monitoring system includes a schedule storage unit configured to store schedule information in association with a set of face identification information for identifying facial images of at least two or more users and period information indicating a period in which the two or more users use an information processing device, an imaging unit configured to capture an image of users using the information processing device, a user determination unit configured to determine whether all users corresponding to the set of face identification information stored in association with the period information match users included in the captured image in the period indicated by the period information on the basis of the captured image captured by the imaging unit and the schedule information stored in the schedule storage unit, and a use control unit configured to control whether to permit use of the information processing device on the basis of a determination result determined by the user determination unit.

6 Claims, 6 Drawing Sheets

(56) References Cited

FOREIGN PATENT DOCUMENTS

| | | |
|---|---|---|
| JP | 2006-259930 A | 9/2006 |
| JP | 2008-217675 A | 9/2008 |
| JP | 2011-505618 A | 2/2011 |
| JP | 2013-238915 A | 11/2013 |
| WO | WO-2009/067676 A1 | 5/2009 |

\* cited by examiner

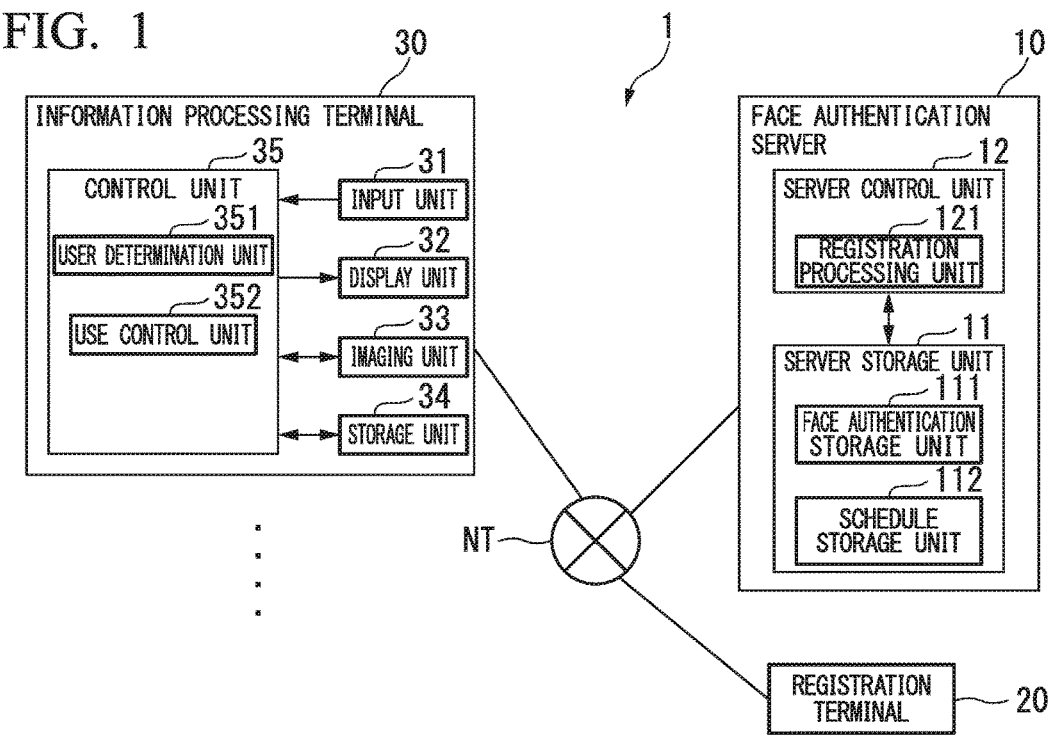

FIG. 3

| RESERVATION NO. | TERMINAL INFORMATION | AUTHENTICATION KEY | USE PERIOD INFORMATION | | FIRST USER INFORMATION | | | SECOND USER INFORMATION | | |
|---|---|---|---|---|---|---|---|---|---|---|
| | | | START DATE AND TIME | END DATE AND TIME | USER ID | USERNAME | FACE IDENTIFICATION INFORMATION | USER ID | USERNAME | FACE IDENTIFICATION INFORMATION |
| 001 | T0001 | YYY...Y | 2014-10-27 10:00:00 | 2014-10-27 10:30:00 | 0001 | ○○ TARO | XXX...X | 0002 | ○× ICHIRO | XXX...X |
| 002 | T0002 | ZZZ...Z | 2014-10-28 15:00:00 | 2014-10-28 17:00:00 | 0002 | ○× ICHIRO | XXX...X | 0003 | ○△ HANAKO | XXX...X |
| ... | ... | ... | ... | ... | ... | ... | ... | ... | ... | ... | ns
MONITORING SYSTEM, MONITORING METHOD, AND PROGRAM

CROSS-REFERENCE TO RELATED APPLICATIONS

This application is a 371 U.S. National Stage of International Application No. PCT/JP2015/081661, filed on Nov. 10, 2015, which claims the benefit of and priority to Japanese Patent Application No. 2014-236919, filed on Nov. 21, 2014. The entire disclosures of the above applications are incorporated herein by reference.

TECHNICAL FIELD

The present invention relates to a monitoring system, a monitoring method, and a program.

BACKGROUND ART

A monitoring system for monitoring an operator of an information processing device or the like is known (for example, refer to Patent Literature 1). In the monitoring system described above, monitoring is performed so that, for example, a person does not stay alone in a controlled area in which an operation is performed to prevent an operator from performing an unauthorized operation or taking out information.

DOCUMENT OF THE PRIOR ART

Patent Literature

[Patent Literature 1]
Japanese Unexamined Patent Application, First Publication No. 2000-297567

SUMMARY OF INVENTION

Problems to be Solved by the Invention

However, although the above-described monitoring system can prevent a person from staying alone in a controlled area, it is possible for an unauthorized operation to be performed and not noticed by the other worker because workers monitor each other to prevent an unauthorized operation. That is, the above-described monitoring system is insufficient for inhibiting an unauthorized operation by a worker.

The present invention has been made in view of solving the above problem, and an objective of the present invention is to provide a monitoring system, a monitoring method, and a program capable of inhibiting an unauthorized operation by a worker.

Means for Solving the Problems

To solve the above problem, a monitoring system according to an aspect of the present invention includes a schedule storage unit configured to store schedule information in association with a set of face identification information for identifying facial images of at least two or more users and period information indicating a period in which the two or more users use an information processing device, an imaging unit configured to capture an image of users using the information processing device, a user determination unit configured to determine whether all users corresponding to the set of face identification information stored in association with the period information match users included in the captured image in the period indicated by the period information on the basis of the captured image captured by the imaging unit and the schedule information stored in the schedule storage unit, and a use control unit configured to control whether to permit use of the information processing device on the basis of a determination result determined by the user determination unit.

In the monitoring system of the present invention, the use control unit may permit the use of the information processing device and display a display image including the captured image on a display unit of the information processing device when it is determined by the user determination unit that all of the users corresponding to the set of face identification information in the period match the users included in the captured image, and the use control unit may prohibit the use of the information processing device when it is determined by the user determination unit that not all of the users corresponding to the set of face identification information match the users included in the captured image.

In the monitoring system of the present invention, the schedule storage unit may store the schedule information and authentication key information for authenticating the use of the information processing device in association with each other, and the user determination unit may acquire the schedule information in association with the authentication key information acquired by the information processing device from the schedule storage unit and determine whether all of the users corresponding to the set of face identification information in the period match the users included in the captured image on the basis of the acquired schedule information and the captured image.

A monitoring method according to an aspect of the present invention is a monitoring method of a monitoring system that includes a schedule storage unit configured to store schedule information in association with a set of face identification information for identifying facial images of at least two or more users and period information indicating a period in which the two or more users use an information processing device, and includes an imaging step in which an imaging unit captures an image of users using the information processing device, a user determining step in which a user determination unit determines whether all users corresponding to the set of face identification information stored in association with the period information match users included in the captured image in the period indicated by the period information on the basis of the captured image captured in the imaging step and the schedule information stored in the schedule storage unit, and a use controlling step in which a use control unit controls whether to permit use of the information processing device on the basis of a determination result determined by the user determination unit.

A program recorded in a computer-readable recording medium according to an aspect of the present invention executes, in a computer of a monitoring system that includes a schedule storage unit configured to store schedule information in association with a set of face identification information for identifying facial images of at least two or more users and period information indicating a period in which the two or more users use an information processing device, an imaging step in which an imaging unit captures an image of users using the information processing device, a user determining step in which a user determination unit determines whether all users corresponding to the set of face identification information whose date and time of use of the information processing device is within the period indicated by the period information match users included in the captured image on the basis of the captured image captured in the imaging step and the schedule information stored in the schedule storage unit, and a use controlling step in which a use control unit controls whether to permit use of the information processing device on the basis of a determination result determined by the user determination unit.

Advantageous Effects of the Invention

According to the present invention, an unauthorized operation by a worker can be inhibited.

BRIEF DESCRIPTION OF DRAWINGS

FIG. 1 is a block diagram illustrating an example of a monitoring system according to a first embodiment.

FIG. 2 is a view illustrating an example of data of a face authentication storage unit according to the first embodiment.

FIG. 3 is a view illustrating an example of data of a schedule storage unit according to the first embodiment.

EMBODIMENTS FOR CARRYING OUT THE INVENTION

Figure 4:
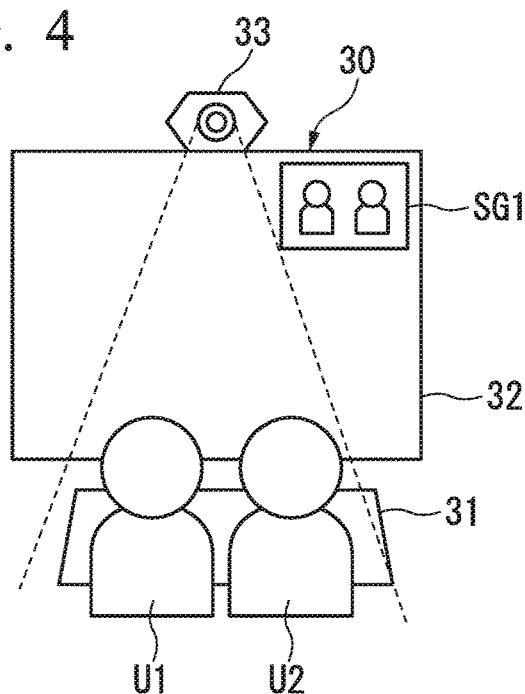
FIG. 4 is a view illustrating a usage example of an information processing terminal according to the first embodiment.

Hereinafter, a monitoring system according to an embodiment of the present invention will be described with reference to the drawings.

First Embodiment

FIG. 1 is a block diagram illustrating an example of a monitoring system 1 according to a first embodiment.

As illustrated in the drawing, the monitoring system 1 includes a face authentication server 10, a registration terminal 20, and an information processing terminal 30. Further, the face authentication server 10, the registration terminal 20, and the information processing terminal 30 are connected to one another via a network NT.

In the example illustrated in FIG. 1, the monitoring system 1 may include a plurality of information processing terminals 30 although a single information processing terminal 30 is described in the description. Likewise, in the example illustrated in FIG. 1, the monitoring system 1 may include a plurality of registration terminals 20 although a single registration terminal 20 is described in the description.

The face authentication server 10 is a server device configured to store information used in face authentication of users using the information processing terminal 30. Here, users refer to people who use (utilize) the information processing terminal 30, and the users include, for example, a worker who performs various information processing tasks using the information processing terminal 30 and a monitoring person who monitors the worker.

The face authentication server 10 includes, for example, a server storage unit 11 and a server control unit 12.

The server storage unit 11 stores information utilized in various processes of the face authentication server 10. The server storage unit 11 stores, for example, information used to authenticate faces of users. The server storage unit 11 includes, for example, a face authentication storage unit 111 and a schedule storage unit 112.

The face authentication storage unit 111 is a storage unit configured to store a face authentication database in which information related to face authentication of users is pre-registered. The face authentication storage unit 111 pre-stores, for example, user identification information for identifying users and face identification information of the users in association with each other. Here, face identification information refers to information for identifying facial images of users and is, for example, feature data of faces extracted from facial images of the users. Here, an example of data of the face authentication storage unit 111 will be described with reference to FIG. 2.

FIG. 2 is a view illustrating an example of the data of the face authentication storage unit 111 according to the present embodiment.

As illustrated in FIG. 2, the face authentication storage unit 111 stores, for example, a "user ID," a "username," and "face identification information" in association with one another. Here, the "user ID" indicates identification information for uniquely identifying a user, and the "username" indicates a name of a user. Each of the "user ID" and the "username" is user identification information for identifying a user. The "face identification information" is feature data of a face of a user.

In the example illustrated in FIG. 2, it is shown that a user whose "user ID" is "0001" has "OO Taro" as a "username", and "face identification information" of the user is stored in association with the "user ID" and the "username" in the face authentication storage unit 111.

Referring back to FIG. 1, the schedule storage unit 112 is a storage unit configured to register schedule information of users using the information processing terminal 30. The schedule storage unit 112 stores, for example, schedule information in association with a set of face identification information for identifying facial images of at least two or more users and period information indicating a period in which the two or more users use the information processing terminal 30. Further, the schedule information stored in the schedule storage unit 112 is registered (stored) by a system administrator through the registration terminal 20, which will be described below. Here, an example of data of the schedule storage unit 112 will be described with reference to FIG. 3.

FIG. 3 is a view illustrating an example of the data of the schedule storage unit 112 according to the present embodiment.

As illustrated in FIG. 3, the schedule storage unit 112, for example, stores a "reservation NO.," "terminal information," an "authentication key," "use period information," "first user information," and "second user information" in association with one another. Here, the "reservation NO." indicates a reservation number for using the information processing terminal 30, and the "terminal information" indicates identification information of the information processing terminal 30 that is scheduled to be used. Also, the "authentication key" indicates an authentication key for logging into the information processing terminal 30. The "use period information" indicates a use period in which use of the information processing terminal 30 is scheduled and includes, for example, a "start date and time" and an "end date and time." Further, the "start date and time" indicates a date and time at which a start of the use of the information processing terminal 30 is scheduled, and the "end date and time" indicates a date and time at which an end of the use of the information processing terminal 30 is scheduled.

The "first user information" and the "second user information" indicate information of users who are scheduled to use the information processing terminal 30. The "first user information" and the "second user information" each contain a "user ID," a "username," and "face identification information." Further, the "user ID," the "username," and the "face identification information" are the same as the information stored in the face authentication storage unit 111.

In the example illustrated in FIG. 3, it is shown that schedule information whose "reservation NO." is "001" has "T0001" as "terminal information," "YYY . . . Y" as an "authentication key," "2014-10-27 10:00:00" as a "start date and time," and "2014-10-27 10:30:00" as an "end date and time." It is shown that, for this schedule information, a "user ID" and a "username" of "first user information" are "0001" and "OO Taro," and feature data of a face of "OO Taro" is stored as "face identification information." Also, it is shown that a "user ID" and a "username" of "second user information" are "0002" and "OX Ichiro," and feature data of a face of "OX Ichiro" is stored as "face identification information."

In this way, the schedule storage unit 112 stores schedule information and authentication key information (an "authentication key") for authenticating use of the information processing terminal 30 in association with each other.

Further, in the example illustrated in FIG. 3, information of three or more users may also be registered as the users although an example in which information of two users is registered is described.

Referring again to FIG. 1, the server control unit 12 is a processor that includes, for example, a central processing unit (CPU) or the like and collectively controls the face authentication server 10. The server control unit 12 includes, for example, a registration processing unit 121.

The registration processing unit 121 registers information on face authentication of users in the face authentication storage unit 111 and schedule information in the schedule storage unit 112. The registration processing unit 121, for example, adds information on face authentication of a new user to the face authentication storage unit 111 or deletes information on face authentication of a registered user by a request from the registration terminal 20 that will be described below.

The registration processing unit 121, for example, registers schedule information in the schedule storage unit 112 by a request from the registration terminal 20, which will be described below. That is, the registration processing unit 121 prepares, for example, schedule information based on at least two or more pieces of designated face identification information from pieces of face identification information stored in the face authentication storage unit 111 and stores the prepared schedule information in the schedule storage unit 112.

Specifically, the registration processing unit 121 acquires a "user ID," a "username," and "face identification information" corresponding to two or more users designated by the registration terminal 20 from the face authentication storage unit 111. The registration processing unit 121 prepares schedule information based on two or more sets of information associated with the acquired "user ID," "username," and "face identification information" and designated "terminal information" and a designated "authentication key" and "use period information." The registration processing unit 121 stores the prepared schedule information in the schedule storage unit 112.

The registration processing unit 121, for example, modifies or deletes registered schedule information by a request from the registration terminal 20, which will be described below.

The registration terminal 20 is a terminal device used by a system administrator. The registration terminal 20 transmits, for example, a request for information on face authentication of users input by the system administrator to be registered in the face authentication storage unit 111 based on a pre-application of users of the information processing terminal 30 to the face authentication server 10 via the network NT. Also, the registration terminal 20 transmits, for example, a request for schedule information to be registered in the schedule storage unit 112 based on information input by the system administrator using an application from the user of the information processing terminal 30 to the face authentication server 10 via the network NT.

The information processing terminal 30 (an example of an information processing device) is a terminal device for users to perform various information processing tasks (a task of investigation, interpretation, and the like of various systems), and the information processing terminal 30 performs, for example, authentication based on an authentication key stored in a universal serial bus (USB) memory by being connected to the USB memory (for example, a dongle) to permit a connection to and start of utilizing (logging into) the information processing terminal 30 when the authentication result is "OK" (authorized). Also, the information processing terminal 30 permits the use of the information processing terminal 30 when users in facial images included in a captured image captured by an imaging unit 33, which will be described below, match two or more users pre-registered in the schedule storage unit 112 of the above-described face authentication server 10 and a period is within a use period pre-registered in the schedule storage unit 112.

The information processing terminal 30 includes an input unit 31, a display unit 32, the imaging unit 33, a storage unit 34, and a control unit 35.

The input unit 31 is, for example, an input device such as a keyboard or a mouse. The input unit 31 accepts various operations and information input by the users of the information processing terminal 30 and outputs the various operations and information input to the control unit 35.

The display unit 32 is, for example, a display device such as a liquid crystal display. The display unit 32 displays, for example, various pieces of information output from the control unit 35. The display unit 32 displays, for example, various pieces of information input through input of users or a captured image captured by the imaging unit 33, which will be described below.

The imaging unit 33 is, for example, a camera, captures an image of users using the information processing terminal 30, and outputs the captured image to the control unit 35.

The storage unit 34 stores information utilized in various processes of the information processing terminal 30. The storage unit 34 stores, for example, information such as the captured image captured by the imaging unit 33.

The control unit 35 is a processor including a CPU or the like and collectively controls the information processing terminal 30. The control unit 35 includes, for example, a user determination unit 351 and a use control unit 352.

The user determination unit 351 determines whether all of at least two or more pre-registered users appear in the captured image on the basis of the captured image captured by the imaging unit 33 and the schedule information pre-registered in the schedule storage unit 112. The user determination unit 351 determines, for example, whether all users whose registered date and time of use of the information processing terminal 30 is within a period indicated by the period information match the users included in the captured image. That is, the user determination unit 351 acquires, for example, schedule information in association with the authentication key information acquired at a login time from the schedule storage unit 112. Further, the user determination unit 351 may store the acquired schedule information in the storage unit 34. The user determination unit 351 determines whether all users corresponding to a set of face identification information stored in association with the period indicated by the period information match the users included in the captured image on the basis of the acquired schedule information and captured image.

In the description below, a "state in which all users corresponding to a set of face identification information match users included in the captured image" will be described by being referred to as a "state in which users are approved."

Here, the user determination unit 351 extracts feature data of a face of each of the users based on facial images of users included in the captured image. That is, the user determination unit 351 extracts, for example, feature data of a face of each of two users when facial images of two people appear in the captured image. The user determination unit 351 compares the extracted feature data of each of the users with feature data of faces of users (pre-registered users) included in the acquired schedule information.

The user determination unit 351 determines that the users included in the captured image match the registered users when feature data of faces extracted from the captured image match feature data of faces of the registered users within a predetermined ratio. In this way, the user determination unit 351 determines whether the users included in the captured image match the registered users on the basis of predetermined feature data of facial images. Then, the user determination unit 351 determines that the above-described state in which users are approved is reached when all of the users included in the acquired schedule information are included in the captured image.

Further, for example, when all of the users included in the schedule information are included in the captured image, the user determination unit 351 determines that the above-described state in which users are approved is reached even when facial images of different people are included in the captured image.

In any one of cases (1) and (2) below or in both of the cases, the user determination unit 351 determines that the above-described state in which users are approved is not reached.

(1) when a date and time of use of the information processing terminal 30 is not within a range of use period information included in the schedule information (2) when at least one of the registered users included in the schedule information does not match any user included in the captured image The user determination unit 351 regularly executes the above-described determination processing after the information processing terminal 30 is logged in. That is, the user determination unit 351 regularly acquires a captured image from the imaging unit 33. The user determination unit 351 regularly determines, for example, whether the above-described state in which users are approved is reached on the basis of the acquired captured image and the schedule information stored in the storage unit 34.

The use control unit 352 controls whether to permit use of the information processing terminal 30 on the basis of a determination result determined by the user determination unit 351. The use control unit 352 permits, for example, the use of the information processing terminal 30 when the user determination unit 351 determines that the above-described state in which users are approved is reached. That is, the use control unit 352 permits the use of the information processing terminal 30 when all of at least two or more pre-registered users appear in the captured image. In this case, for example, the use control unit 352 permits the use of the information processing terminal 30 and displays a display image including the captured image on the display unit 32 of the information processing terminal 30.

For example, when it is determined by the user determination unit 351 that the above-described state in which users are approved is not reached, the use control unit 352 prohibits the use of the information processing terminal 30. Here, to "prohibit the use of the information processing terminal 30" indicates, for example, locking a display screen of the display unit 32 or logging out a user. The use control unit 352, for example, logs out a user right after logging in and locks the display screen of the display unit 32 at times other than right after logging in.

Next, an operation of the monitoring system 1 according to the present embodiment will be described with reference to the drawings.

First, a usage example of the information processing terminal 30 of the monitoring system 1 will be described with reference to FIG. 4.

FIG. 4 is a view illustrating the usage example of the information processing terminal 30 according to the present embodiment.

In the example illustrated in FIG. 4, an example in which two users U1 and U2 use the information processing terminal 30 is illustrated. Here, one of the users U1 and U2 is a worker and the other user is a monitoring person who monitors the worker. It is assumed that the two users U1 and U2 perform an information processing task using the information processing terminal 30 as a group.

In this example, a state in which the users U1 and U2 match users pre-registered in the schedule storage unit 112 is illustrated. The imaging unit 33 captures a captured image including facial images of the users U1 and U2 who are about to perform a task using the information processing terminal 30. The user determination unit 351 acquires the captured image and acquires schedule information in association with authentication key information acquired at a login time from the schedule storage unit 112. The user determination unit 351 determines whether the above-described state in which users are approved is reached on the basis of the acquired schedule information and captured image. Here, because the state in which users are approved is reached, the use control unit 352 permits the use of the information processing terminal 30, permits a display of the information processing task to be displayed on the display unit 32, and displays the captured image captured by the imaging unit 33 as a sub-image SG1 on the display unit 32.

In this state, the users U1 and U2 execute various information processing tasks by operating the input unit 31 or the like.

Figure 5:
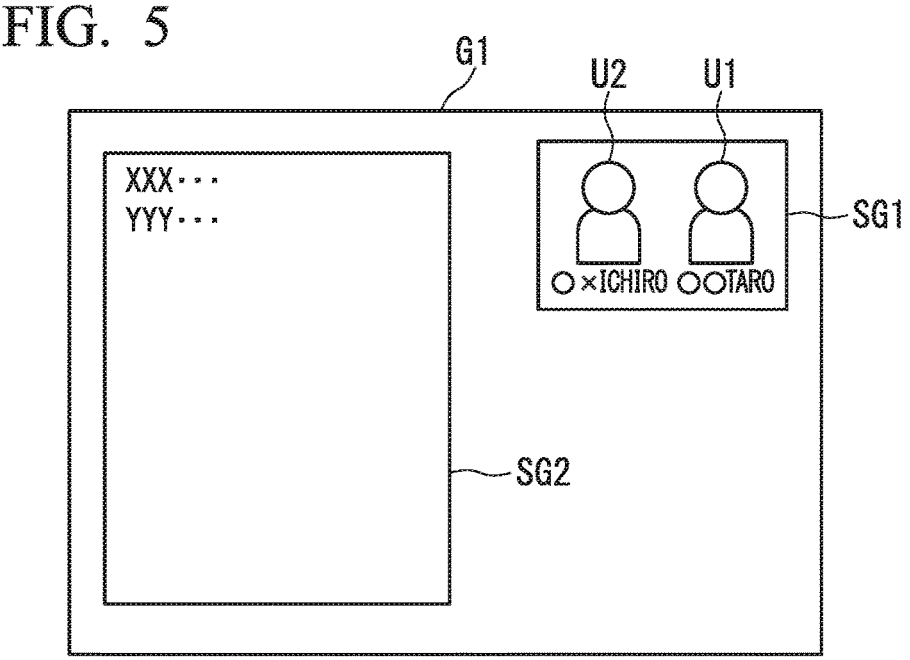
FIG. 5 is a view illustrating a display example of the information processing terminal according to the first embodiment.

FIG. 5 is a view illustrating a display example of the information processing terminal 30 according to the present embodiment.

In the example illustrated in the drawing, a display example of a case in which the use of the information processing terminal 30 is permitted in the state illustrated in FIG. 4 is illustrated. In this case, as illustrated in the drawing, the sub-image SG1 of the captured image and a work image SG2 that is currently being worked on are displayed on a display screen G1.

Further, the use control unit 352 displays the captured image in which the users U1 and U2 appear on the display unit 32 as the sub-image SG1 and displays usernames (for example, "OO Taro" and the like) of the users U1 and U2 recognized from facial images.

In the state illustrated in FIGS. 4 and 5, for example, when at least one of the users U1 and U2 leaves his/her seat, the user determination unit 351 determines that the above-described state in which users are approved is not reached. Due to this, the use control unit 352 prohibits the use of the information processing terminal 30 and locks the display screen G1.

Next, an example of an operation of the monitoring system 1 according to the present embodiment will be described with reference to FIG. 6.

Figure 6:
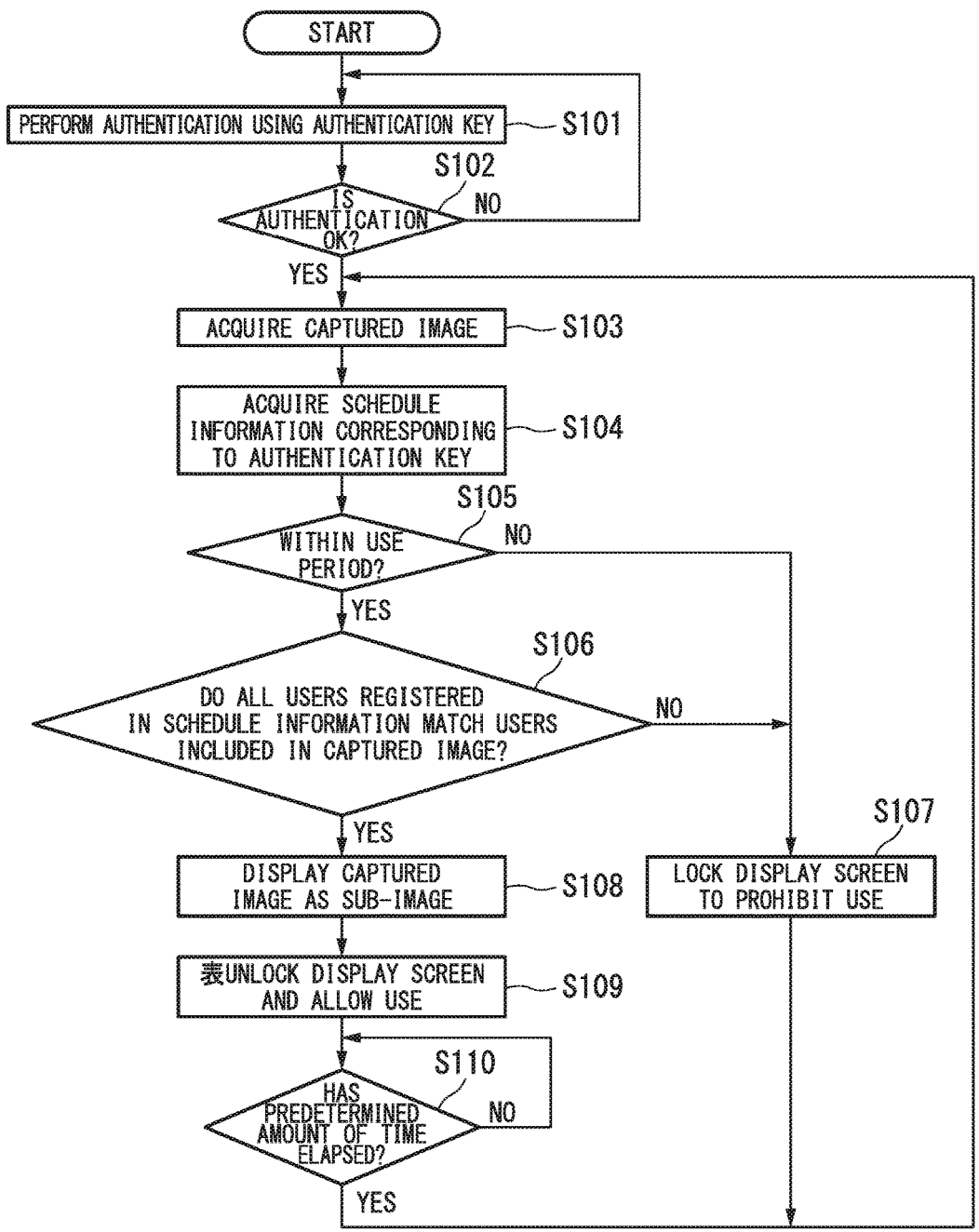
FIG. 6 is a flowchart illustrating an example of an operation of the monitoring system according to the first embodiment.

FIG. 6 is a flowchart illustrating an example of an operation of the monitoring system 1 according to the present embodiment.

In the drawing, first, the information processing terminal 30 performs authentication using an authentication key (Step S101). That is, for example, a USB memory in which the authentication key (authentication key information) is stored is connected to the information processing terminal 30 by a user, and the control unit 35 performs authentication using the authentication key acquired from the USB memory.

Next, the control unit 35 determines whether the authentication by the authentication key is "OK" (Step S102). When the authentication is "OK" (Step S102: YES), the control unit 35 advances the process to Step S103. When the authentication is not "OK" (Step S102: NO), the control unit 35 returns the process to Step S101.

In Step S103, the user determination unit 351 of the control unit 35 acquires a captured image. That is, the user determination unit 351 operates the imaging unit 33 and acquires the captured image captured by the imaging unit 33. The user determination unit 351 stores, for example, the acquired captured image in the storage unit 34.

The user determination unit 351 acquires schedule information corresponding to the authentication key (Step S104). That is, the user determination unit 351 acquires the schedule information corresponding to the above-described authentication key from the schedule storage unit 112 of the face authentication server 10 via the network NT. The user determination unit 351 stores, for example, the acquired schedule information in the storage unit 34. Further, at least two or more users are registered in the schedule information.

Next, the user determination unit 351 determines whether a current date and time are within a use period in the acquired schedule information (Step S105). When the current date and time are within the use period in the acquired schedule information (Step S105: YES), the user determination unit 351 advances the process to Step S106. When the current date and time are not within the use period in the acquired schedule information (Step S105: NO), the user determination unit 351 advances the process to Step S107.

In Step S106, the user determination unit 351 determines whether all of the users registered in the schedule information match users included in the captured image (whether the above-described state in which users are approved is reached). That is, based on facial images of the users included in the captured image stored in the storage unit 34, the user determination unit 351 extracts feature data of a face of each of the users. The user determination unit 351 compares the extracted feature data of the face of each of the users with the feature data (face identification information) of faces of the users (pre-registered users) included in the acquired schedule information. The user determination unit 351 determines that the users included in the captured image match the registered users when the feature data of the faces extracted from the captured image match the feature data of the faces of the registered users by a predetermined ratio. Then, the user determination unit 351 determines that all of the users registered in the above-described schedule information match the users included in the captured image when all of the users included in the acquired schedule information are included in the captured image.

The user determination unit 351 advances the process to Step S108 when it is determined that all of the users registered in the schedule information match the users included in the captured image (S106: YES). The user determination unit 351 advances the process to Step S107 when it is determined that not all of the users registered in the schedule information match the users included in the captured image (Step S106: NO).

In Step S107, the use control unit 352 locks the display screen and prohibits the use. That is, the use control unit 352 locks the display screen of the display unit 32 of the information processing terminal 30 to prohibit the use of the information processing terminal 30. After Step S107, the use control unit 352 returns the process to Step S103.

In Step S108, the use control unit 352 displays the captured image as a sub-image. That is, for example, as illustrated in FIG. 5, the use control unit 352 displays the captured image stored in the storage unit 34 as the sub-image on the display unit 32.

Next, the use control unit 352 unlocks the display screen and allows the use (Step S109). That is, the use control unit 352 displays a normal display on the display screen of the display unit 32 of the information processing terminal 30 and permits the use of the information processing terminal 30. In this way, two or more users may perform various information processes by using the information processing terminal 30.

Next, the use control unit 352 determines whether a predetermined amount of time has elapsed (Step S110). That is, the use control unit 352 uses a timer or the like (not illustrated) to determine whether the predetermined amount of time has elapsed. When the predetermined amount of time has elapsed (Step S110: YES), the use control unit 352 returns the process to Step S103 and repeats the process from Step S103 to Step S110. When the predetermined amount of time has not elapsed (Step S110: NO), the use control unit 352 repeats the process of Step S110 until the predetermined amount of time elapses.

Next, an operation of a modified example of the monitoring system 1 of the present embodiment will be described with reference to FIG. 7.

Figure 7:
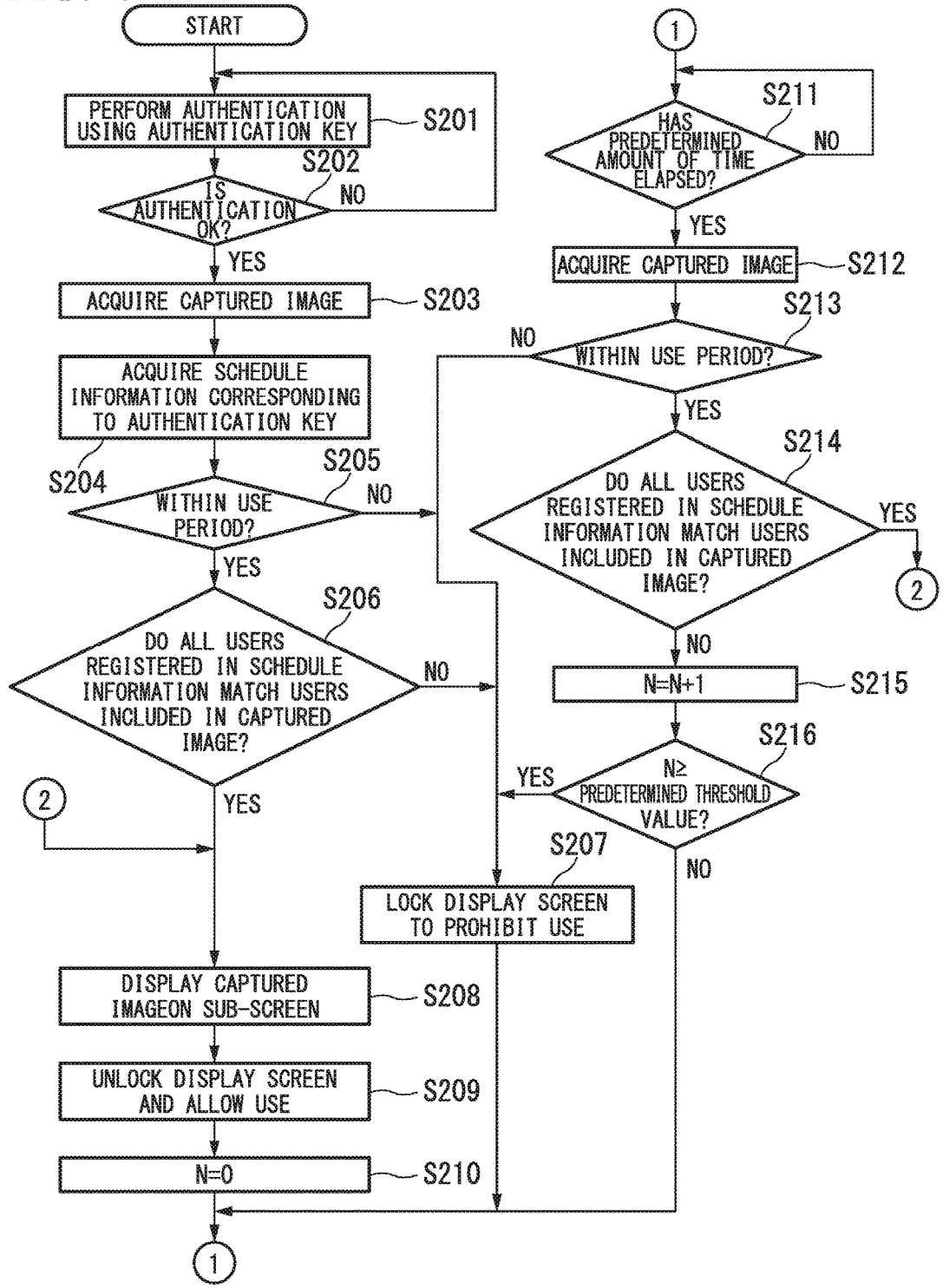
FIG. 7 is a flowchart illustrating an operation of a modified example of the monitoring system according to the first embodiment.

FIG. 7 is a flowchart illustrating the operation of the modified example of the monitoring system 1 according to the embodiment.

In the modified example, after use of the information processing terminal 30 is permitted, the use control unit 352 prohibits the use of the information processing terminal 30 when it is determined that the above-described state in which users are approved is not reached a predetermined number of times or more in a row by the user determination unit 351.

Because a process from Step S201 to Step S209 illustrated in FIG. 7 is the same as the process from Step S101 to Step S109 illustrated in FIG. 6, a description thereof will be omitted here.

In Step S210, the use control unit 352 initializes a variable N (N=0).

Next, the use control unit 352 determines whether a predetermined amount of time has elapsed (Step S211). That is, the use control unit 352 uses a timer or the like (not illustrated) to determine whether the predetermined amount of time has elapsed. When the predetermined amount of time has elapsed (Step S211: YES), the use control unit 352 advances the process to Step S212. When the predetermined amount of time has not elapsed (Step S211: NO), the use control unit 352 repeats the process of Step S211 until the predetermined amount of time elapses.

In Step S212, the user determination unit 351 acquires a captured image. That is, the user determination unit 351 operates the imaging unit 33 to acquire a captured image captured by the imaging unit 33. The user determination unit 351 stores, for example, the acquired captured image in the storage unit 34.

Next, the user determination unit 351 determines whether a current date and time are within a use period in the acquired schedule information (Step S213). When the current date and time are within the use period in the acquired schedule information (Step S213: YES), the user determination unit 351 advances the process to Step S214. When the current date and time are not within the use period in the acquired schedule information (Step S213: NO), the user determination unit 351 advances the process to Step S207.

In Step S214, the user determination unit 351 determines whether all of the users registered in the schedule information match users included in the captured image (whether the above-described state in which users are approved is reached). The determination processing by the user determination unit 351 is the same as the process of Step S206 (process of Step S106 illustrated in FIG. 6). The user determination unit 351 advances the process to Step S208 when it is determined that all of the users registered in the schedule information match the users included in the captured image (Step S214: YES). The user determination unit 351 advances the process to Step S215 when it is determined that not all of the users registered in the schedule information match the users included in the captured image (Step S214: NO).

In Step S215, the use control unit 352 adds "1" to the variable N (N=N+1).

Next, the use control unit 352 determines whether a value of the variable N has reached a predetermined threshold value or larger (N≥predetermined threshold value) (Step S216). When the value of the variable N has reached the predetermined threshold value or larger (Step S216: YES), the use control unit 352 advances the process to Step S207 and locks the display screen. When the value of the variable N is less than the predetermined threshold value (N<predetermined threshold value) (Step S216: NO), the use control unit 352 returns the process to Step S211.

In this way, in the present modified example, after the use of the information processing terminal 30 is permitted, the use control unit 352 prohibits the use of the information processing terminal 30 when it is determined that the state in which users are approved is not reached a predetermined number of times or more in a row by the user determination unit 351.

As described above, the monitoring system 1 according to the present embodiment includes the schedule storage unit 112, the imaging unit 33, the user determination unit 351, and the use control unit 352. The schedule storage unit 112 stores schedule information in association with a set of face identification information (for example, feature data of faces) for identifying facial images of at least two or more users and period information indicating a period in which the two or more users use the information processing terminal 30 (the information processing device). The imaging unit 33 captures an image of the users using the information processing terminal 30. The user determination unit 351 determines whether all users corresponding to the set of face identification information whose date and time of use of the information processing terminal 30 are within the period indicated by the period information match users included in the captured image on the basis of the captured image captured by the imaging unit 33 and the schedule information stored in the schedule storage unit 112. The use control unit 352 controls whether to permit the use of the information processing terminal 30 on the basis of a determination result determined by the user determination unit 351. For example, the use control unit 352 permits the use of the information processing terminal 30 when it is determined that all of the users corresponding to the set of face identification information whose date and time of use of the information processing terminal 30 are within the period match the users included in the captured image.

In this way, for example, because the information processing terminal 30 can be used when all of two or more users pre-stored (pre-registered) in the schedule storage unit 112 as schedule information are included in a captured image, the monitoring system 1 according to the present embodiment can inhibit an unauthorized operation by a worker (a user). That is, in the monitoring system 1 according to the present embodiment, instead of an unauthorized operation being prevented simply by workers monitoring each other, a task needs to be performed so that an image of two or more users pre-registered as schedule information is captured by the imaging unit 33. When, for example, not all of the two or more users pre-stored (pre-registered) in the schedule storage unit 112 as the schedule information are included in the captured image, the monitoring system 1 according to the present embodiment may prevent the use of the information processing terminal 30. Due to this, because rules for performing a task while checking with a plurality of people can be made strict, the monitoring system 1 according to the present embodiment may inhibit an unauthorized operation by a worker (a user). The monitoring system 1 according to the present embodiment can reduce the possibility that an unauthorized operation will be performed and not get caught by another worker.

In the present embodiment, when it is determined by the user determination unit 351 that all users corresponding to the set of face identification information whose date and time of use of the information processing terminal 30 are within the above-described period match the users included in the captured image, the use control unit 352 permits the use of the information processing terminal 30 and displays a display image including the captured image on the display unit 32 of the information processing terminal 30. The use control unit 352 prohibits the use of the information processing terminal 30 when it is determined by the user determination unit 351 that the above-described matching state is not reached.

In this way, when not all of the two or more users pre-stored (pre-registered) in the schedule storage unit 112 as the schedule information are included in the captured image, the monitoring system 1 according to the present embodiment may physically prohibit the use of the information processing terminal 30. Also, by displaying a display image including the captured image on the display unit 32 of the information processing terminal 30, the monitoring system 1 according to the present embodiment can cause an operator to be aware that he or she is being monitored. Therefore, the monitoring system 1 according to the present embodiment can further reduce the possibility that an unauthorized operation is performed.

In the present embodiment, the schedule storage unit 112 stores schedule information and authentication key information (for example, an authentication key) for authenticating the use of the information processing terminal 30 in association with each other. The user determination unit 351 acquires the schedule information associated with the authentication key information acquired by the information processing terminal 30 from the schedule storage unit 112. The user determination unit 351 determines whether or not all of the users corresponding to the set of face identification information whose date and time of use of the information processing terminal 30 are within the above-described period match the users included in the captured image on the basis of the acquired schedule information and captured image.

In this way, because the registered schedule information can be searched for on the basis of the authentication key information, the monitoring system 1 according to the present embodiment can promptly select target schedule information. Also, by associating the authentication key information and the schedule information with each other, the monitoring system 1 according to the present embodiment can reduce unauthorized use of the information processing terminal 30. For example, by authentication key information corresponding to a user being distributed (for example, a USB memory containing the authentication key information being distributed) when registering the schedule information to the schedule storage unit 112, the monitoring system 1 according to the present embodiment can reduce the possibility that the information processing terminal 30 will be used in an unauthorized manner.

Also, in the present embodiment, the user determination unit 351 regularly determines whether all of the users corresponding to the set of face identification information whose date and time of use of the information processing terminal 30 are within the above-described period match the users included in the captured image. After the use of the information processing terminal 30 is permitted, the use control unit 352 may prohibit the use of the information processing terminal 30 when it is determined that the users do not match a predetermined number of times or more in a row by the user determination unit 351.

In this way, for example, when at least one of a plurality of pre-registered users leaves his/her seat for a predetermined period or longer (the predetermined number of times or more) and does not appear in the captured image, the monitoring system 1 according to the present embodiment can forcibly prohibit the use of the information processing terminal 30. The monitoring system 1 according to the present embodiment does not prohibit the use of the information processing terminal 30 when the period (the number of times) in which at least one user leaves his/her seat is less than the predetermined period (the predetermined number of times). Due to this, for example, when a case in which a facial image cannot be properly recognized due to a worker facing sideward, downward, or the like for an instant occurs in a short amount of time, the monitoring system 1 according to the present embodiment does not unnecessarily prohibit the use of the information processing terminal 30 and thus does not lower operation efficiency thereof.

Also, the monitoring system 1 according to the present embodiment includes the face authentication storage unit 111 and the registration processing unit 121. The face authentication storage unit 111 pre-stores user identification information (for example, a user ID and the like) for identifying users and face identification information (for example, feature data of faces) of the users in association of each other. The registration processing unit 121 prepares schedule information based on at least two or more designated pieces of face identification information among pieces of face identification information stored in the face authentication storage unit 111. The registration processing unit 121 stores (registers) the prepared schedule information in the schedule storage unit 112.

In this way, the monitoring system 1 according to the present embodiment does not have to prepare face identification information of users every time schedule information is registered because the face identification information of the users is pre-stored in the face authentication storage unit 111. Due to this, the monitoring system 1 according to the present embodiment can perform preparation of the schedule information by a simple means of acquiring target face identification information from the face authentication storage unit 111. That is, the monitoring system 1 according to the present embodiment can execute registration of the schedule information by a simple means.

A monitoring method according to the present embodiment is a monitoring method of the monitoring system 1 that includes the schedule storage unit 112 configured to store schedule information in association with a set of face identification information for identifying facial images of at least two or more users and period information indicating a period in which the two or more users use the information processing terminal 30. The monitoring method according to the present embodiment includes an imaging step, a user determining step, and a use controlling step. In the imaging step, the imaging unit 33 captures an image of users using the information processing terminal 30. In the user determining step, the user determination unit 351 determines whether all users corresponding to the set of face identification information whose date and time of use of the information processing terminal 30 are within the period indicated by the period information match the users included in the captured image on the basis of the captured image captured in the imaging step and the schedule information stored in the schedule storage unit 112. In the use controlling step, the use control unit 352 controls whether to permit use of the information processing terminal 30 on the basis of a determination result determined by the user determination unit 351.

In this way, like the above-described monitoring system 1, the monitoring method according to the present embodiment can inhibit an unauthorized operation by a worker (a user).

Second Embodiment

Next, a monitoring system 1*a* according to a second embodiment will be described with reference to FIG. 8.

Figure 8:
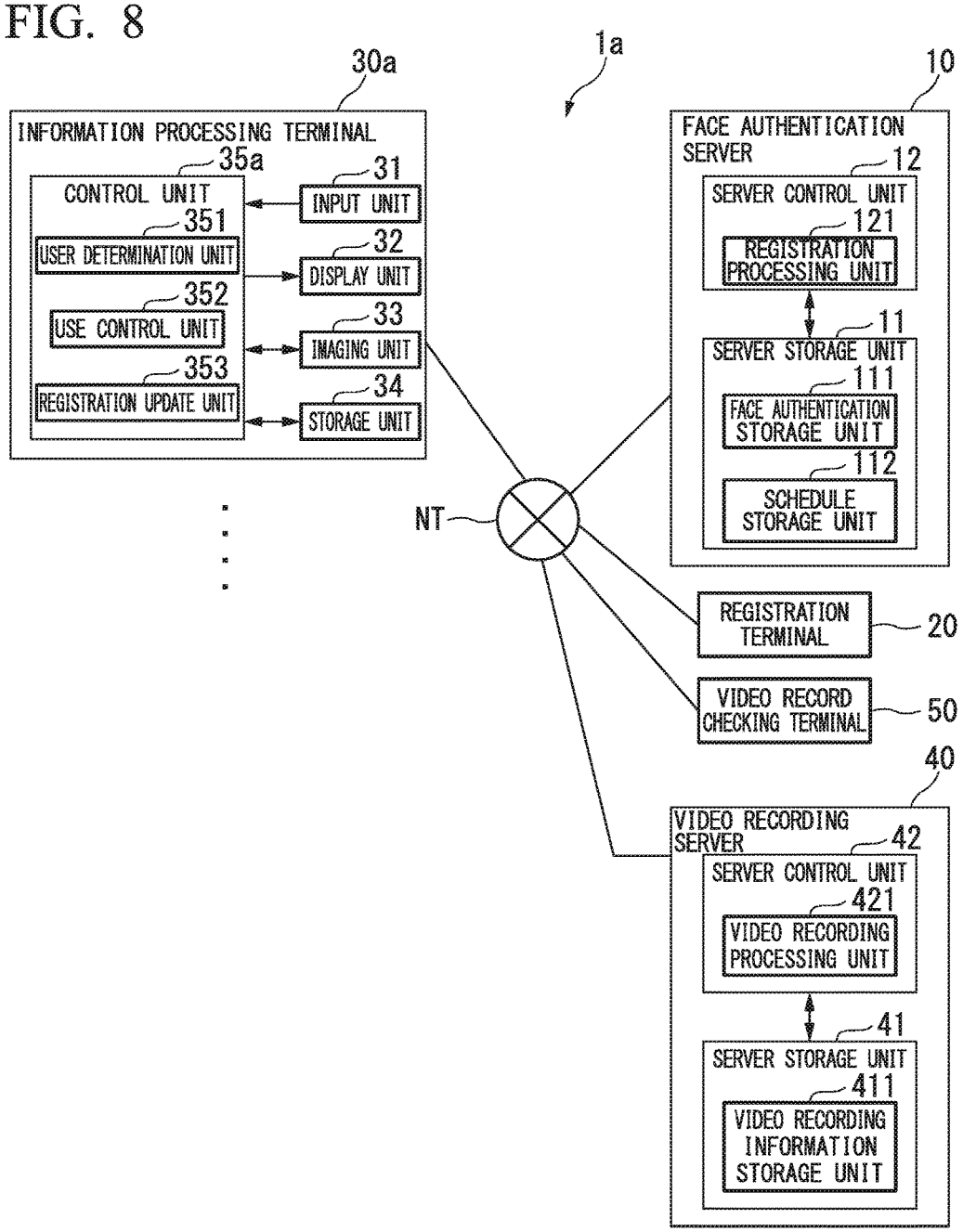
FIG. 8 is a block diagram illustrating an example of a monitoring system according to a second embodiment.

FIG. 8 is a block diagram illustrating an example of the monitoring system 1a according to the second embodiment.

As illustrated in the drawing, the monitoring system 1a includes a face authentication server 10, a registration terminal 20, an information processing terminal 30a, a video recording server 40, and a video record checking terminal 50. Further, the face authentication server 10, the registration terminal 20, the information processing terminal 30a, the video recording server 40, and the video record checking terminal 50 are connected to one another via a network NT.

In the drawing, like reference numerals will be assigned to the same elements as those in FIG. 1, and descriptions thereof will be omitted.

The present embodiment is different from the first embodiment in that the information processing terminal 30a includes a registration update unit 353 and in that the monitoring system 1a includes the video recording server 40 and the video record checking terminal 50. Hereinafter, these differences will be described in detail below.

The information processing terminal 30a includes an input unit 31, a display unit 32, an imaging unit 33, a storage unit 34, and a control unit 35a. The control unit 35a is a processor that includes a CPU or the like and collectively controls the information processing terminal 30a. The control unit 35a includes, for example, a user determination unit 351, a use control unit 352, and the registration update unit 353.

After the use control unit 352 permits use of the information processing terminal 30a, the registration update unit 353 newly generates face identification information (for example, feature data of a face) corresponding to each user included in schedule information used by the user determination unit 351 on the basis of a captured image captured by the imaging unit 33. The registration update unit 353 updates the face identification information corresponding to each target user stored in the face authentication storage unit 111 of the face authentication server 10 to the newly generated face identification information. That is, the registration update unit 353 updates the face identification information stored in the face authentication storage unit 111 of the face authentication server 10 to face identification information extracted from the latest facial image captured by the imaging unit 33. Further, the registration update unit 353 may allow a process of updating the face identification information stored in the face authentication storage unit 111 to be performed every time a user performs a task using the information processing terminal 30a or regularly such as weekly and monthly.

The video recording server 40 is a server device configured to collect and record image data (for example, screen shot data) of a display screen displayed on the display unit 32 of the information processing terminal 30a at predetermined intervals. The video recording server 40 includes, for example, a server storage unit 41 and a server control unit 42. Further, a user's face, name, command line on which work is done, and the like may be recorded in the image data of the display screen.

The server storage unit 41 stores information utilized in various processes of the video recording server 40. The server storage unit 41 stores, for example, the above-described image data of the display screen. The server storage unit 41 includes, for example, a video recording information storage unit 411.

The video recording information storage unit 411 stores, for example, a display image (for example, screen shot data) including a captured image and display date and time information indicating a date and time at which the display image is displayed in association with each other. Here, the display image including the captured image is, for example, image data such as the display screen G1 illustrated in FIG. 5. Further, the video recording information storage unit 411 may store, for example, the display image including the captured image, the display date and time information, and identification information (for example, terminal information) of the information processing terminal 30a in association with one another.

The information (video recording information) stored in the video recording information storage unit 411 may be read later by the video record checking terminal 50, which will be described below, and is used to check a user who used the information processing terminal 30a and content of a task performed by the user.

The server control unit 42 is, for example, a processor including a CPU or the like and collectively controls the video recording server 40. The server control unit 42 includes, for example, a video recording processing unit 421.

The video recording processing unit 421 stores at least the above-described display image and the display date and time information in association with each other in the video recording information storage unit 411 at predetermined intervals. The server control unit 42 acquires, for example, the terminal information of the information processing terminal 30a, the display image including the captured image, and the display date and time information from the information processing terminal 30a via the network NT at predetermined intervals. The video recording processing unit 421 sequentially adds to and stores the acquired terminal information, display image including the captured image, and display date and time information in association with one another in the video recording information storage unit 411.

The video record checking terminal 50 is a terminal device used by a system administrator and is used to check information stored in the video recording information storage unit 411 of the video recording server 40. The video record checking terminal 50 transmits, for example, a request for information stored in the video recording information storage unit 411 of the video recording server 40 to be read to the video recording server 40 via the network NT. The video record checking terminal 50 acquires the information stored in the video recording information storage unit 411 via the network NT and displays the acquired information on a display unit (not illustrated).

Because other constitutions and basic operations of the monitoring system 1a according to the present embodiment are the same as in the above-described monitoring system 1 according to the first embodiment, descriptions thereof will be omitted here.

As described above, the monitoring system 1a according to the present embodiment includes the video recording information storage unit 411 and the video recording processing unit 421. The video recording information storage unit 411 stores the display image including the captured image and the display date and time information indicating the date and time at which the display image is displayed in association with each other. The video recording processing unit 421 stores the display image and the display date and time information in association with each other in the video recording information storage unit 411 at predetermined intervals.

In this way, because a user who used the information processing terminal 30a, a use date and time, content of a task, and the like can be checked later, when a problem such as any unauthorized operation is performed occurs, the monitoring system 1a according to the present embodiment can easily confirm a cause (a user, content of a task, etc.). By making the fact that video recording information is being recorded in the video recording information storage unit 411 known, the monitoring system 1a according to the present embodiment exhibits an effect of inhibiting an unauthorized operation by a worker.

The monitoring system 1a according to the present embodiment includes the registration update unit 353. After the use control unit 352 permits use of the information processing terminal 30a, the registration update unit 353 newly generates face identification information corresponding to each of the users included in the schedule information used by the user determination unit 351 on the basis of the captured image captured by the imaging unit 33. The registration update unit 353 updates the face identification information corresponding to each of the users stored in the face authentication storage unit 111 to the newly generated face identification information.

In this way, the monitoring system 1a according to the present embodiment can reduce erroneous determination of user face authentication because the registered face identification information can be regularly updated. The monitoring system 1a according to the present embodiment can reduce the possibility that a user will be erroneously determined due to, for example, the user getting a tan or changing his/her hairstyle.

Further, the present invention is not limited to each of the embodiments described above and can be modified within a scope that does not depart from the gist of the present invention.

For example, in each of the embodiments described above, although an example in which the information processing terminal 30 (or 30a) includes the user determination unit 351 and the use control unit 352 has been described, another device (for example, the face authentication server 10 or the like) may include the user determination unit 351 and the use control unit 352.

Also, some of the elements included in the face authentication server 10 and the video recording server 40 may be included in other devices.

Although an example in which the information processing terminal 30a includes the registration processing unit 121 has been described, another device may include the registration processing unit 121.

The registration terminal 20 may include, for example, a function of the video record checking terminal 50.

In each of the embodiments described above, although an example in which, when all of users included in schedule information are included in a captured image, the user determination unit 351 determines that the above-described state in which users are approved is reached even when facial images of different people are included in the captured image has been described, embodiments are not limited thereto. For example, when facial images of different people are included in the captured image, as in the example described above, the user determination unit 351 may determine that the state in which users are approved is not reached.

When a device other than the information processing terminal 30 (or 30a) corresponding to terminal information registered as schedule information is used, the user determination unit 351 may determine that the state in which users are approved is not reached. In this way, the monitoring system 1 (or 1a) may further inhibit an unauthorized operation by a worker (a user).

In each of the embodiments described above, although an example in which the information processing terminal 30 (or 30a) acquires authentication key information via a USB memory has been described, the information processing terminal 30 (or 30a) may acquire the authentication key information via, for example, the input unit 31 or the like.

Also, although an example in which the information processing terminal 30 (or 30a) performs authentication using the authentication key information has been described, the information processing terminal 30 (or 30a) may not perform authentication using the authentication key information and, for example, may allow determination processing by the user determination unit 351 due to a start key of the input unit 31 being pressed.

Further, each of the elements included in the above-described monitoring system 1 (or 1a) has a computer system therein. Additionally, a program for realizing functions of each of the elements included in the above-described monitoring system 1 (or 1a) may be recorded in a computer readable recording medium, and the program recorded in the recording medium may be read by a computer system and executed to perform processing in each of the elements included in the above-described monitoring system 1 (or 1a). Here, "to cause a computer system to read and execute a program recorded in a recording medium" includes installing the program in a computer system. The "computer system" referred to here includes hardware such as an operating system (OS) and a peripheral device.

Also, the "computer system" may include a plurality of computer devices connected via a network including the Internet or a communication line such as a wide area network (WAN), a local area network (LAN), or a dedicated line. The "computer readable recording medium" refers to a storage device such as a hard disk embedded in a computer system and a portable medium including a flexible disk, a magneto-optical disk, a read-only memory (ROM), and a compact disc (CD)-ROM. In this way, the recording medium in which the program is stored may be a non-transient recording medium such as a CD-ROM.

The recording medium also includes a recording medium provided inside or outside and accessible by a distribution server for distributing the program. Further, a constitution in which the program is divided into a plurality of parts, downloaded at different times, and then combined in each of the constitutions included in the monitoring system 1 (or 1a) is possible, and distribution servers configured to distribute the divided parts of the program may be different. Furthermore, the "computer readable recording medium," such as a volatile memory (a random access memory (RAM)) inside a computer system serving as a server or a client when the program is transmitted via a network, holds the program for a certain amount of time. The program may be for realizing some of the above-described functions. Furthermore, the program may be a so-called differential file (a differential program) that can realized the above-described functions through a combination with a program already recorded in the computer system.

Part or all of the above-described functions may be realized as an integrated circuit such as a large scale integration (LSI). Each of the above-described functions may be individually implemented as a processor, or a part or all thereof may be integrated into a processor. A method of forming an integrated circuit is not limited to an LSI, and may be realized by a dedicated circuit or a universal processor. When an integrated circuit technology replacing an LSI emerges due to an advance in semiconductor technology, an integrated circuit using such technology can be used.

REFERENCE SYMBOLS 1, 1a Monitoring system
10 Face authentication server
11, 41 Server storage unit
21, 42 Server control unit
20 Registration terminal
30, 30a Information processing terminal
31 Input unit
32 Display unit
33 Imaging unit
34 Storage unit
35, 35a Control unit
40 Video recording server
50 Video record checking terminal
111 Face authentication storage unit
112 Schedule storage unit
121 Registration processing unit
351 User determination unit
352 Use control unit
353 Registration update unit
411 Video recording information storage unit
421 Video recording processing unit
NT Network

The invention claimed is:

1. A monitoring system comprising at least one processor programmed to:
   store schedule information in association with a set of face identification information for identifying facial images of at least two or more users and period information indicating a period in which the two or more users use an information processing device;
   capture an image of users using the information processing device;
   determine whether all users corresponding to the set of face identification information stored in association with the period information match users included in the captured image of the users in the period indicated by the period information on the basis of the captured image and the schedule information;
   permits the use of the information processing device and displays a display image including the captured image on a display unit of the information processing device when it is determined that all of the users corresponding to the set of face identification information in the period match the users included in the captured image; and
   prohibits the use of the information processing device when it is determined that not all of the users corresponding to the set of face identification information match the users included in the captured image.

2. A monitoring system comprising at least one processor programmed to:
   store schedule information in association with a set of face identification information for identifying facial images of at least two or more users and period information indicating a period in which the two or more users use an information processing device;
   capture an image of users using the information processing device;
   determine whether all users corresponding to the set of face identification information stored in association with the period information match users included in the captured image of the users in the period indicated by the period information on the basis of the captured image and the schedule information;
   control whether to permit use of the information processing device on the basis of a determination result as of whether or not all of the users corresponding to the set of face identification information in the period match the users included in the captured image,
   wherein:
   the processor is further programmed to store the schedule information and authentication key information for authenticating the use of the information processing device in association with each other; and
   acquires the schedule information in association with the authentication key information acquired by the information processing device and determines whether all of the users corresponding to the set of face identification information in the period match the users included in the captured image on the basis of the acquired schedule information and the captured image.

3. A monitoring method of a monitoring system, comprising:
   storing schedule information in association with a set of face identification information for identifying facial images of at least two or more users and period information indicating a period in which the two or more users use an information processing device;
   capturing an image of users using the information processing device;
   determining whether all users corresponding to the set of face identification information stored in association with the period information match users included in the captured image of the users in the period indicated by the period information on the basis of the captured image and the schedule information;
   permitting the use of the information processing device and displays a display image including the captured image on a display unit of the information processing device when it is determined that all of the users corresponding to the set of face identification information in the period match the users included in the captured image; and
   prohibiting the use of the information processing device when it is determined that not all of the users corresponding to the set of face identification information match the users included in the captured image.

4. The monitoring method according to claim 3, further comprising:
   storing the schedule information and authentication key information for authenticating the use of the information processing device in association with each other; and
   acquiring the schedule information in association with the authentication key information acquired by the information processing device and determining whether all of the users corresponding to the set of face identification information in the period match the users included in the captured image on the basis of the acquired schedule information and the captured image.

5. A non-transitory computer readable recording medium that stores a program for executing, in a computer of a monitoring system, a monitoring method comprising:
   storing schedule information in association with a set of face identification information for identifying facial images of at least two or more users and period information indicating a period in which the two or more users use an information processing device:
   capturing an image of users using the information processing device;

determining whether all users corresponding to the set of face identification information stored in association with the period information match users included in the captured image in the period indicated by the period information on the basis of the captured image and the schedule information;

permitting the use of the information processing device and displays a display image including the captured image on a display unit of the information processing device when it is determined that all of the users corresponding to the set of face identification information in the period match the users included in the captured image; and prohibiting the use of the information processing device when it is determined that not all of the users corresponding to the set of face identification information match the users included in the captured image.

6. The non-transitory computer readable recording medium that stores the program for executing the monitoring method according to claim 5, the monitoring method further comprising:

storing the schedule information and authentication key information for authenticating the use of the information processing device in association with each other; and acquiring the schedule information in association with the authentication key information acquired by the information processing device and determining whether all of the users corresponding to the set of face identification information in the period match the users included in the captured image on the basis of the acquired schedule information and the captured image.

* * * * *